(12) United States Patent
Sekiguchi et al.

(10) Patent No.: US 9,981,694 B2
(45) Date of Patent: May 29, 2018

(54) VEHICLE FRONT STRUCTURE

(71) Applicants: HONDA MOTOR CO., LTD., Tokyo (JP); H-ONE CO., LTD., Saitama-shi, Saitama (JP)

(72) Inventors: Tomohide Sekiguchi, Wako (JP); Hisaharu Kato, Saitama (JP)

(73) Assignees: HONDA MOTOR CO., LTD., Tokyo (JP); H-ONE CO., LTD., Saitama-Shi (JP)

( * ) Notice: Subject to any disclaimer, the term of this patent is extended or adjusted under 35 U.S.C. 154(b) by 0 days. days.

(21) Appl. No.: 15/405,529

(22) Filed: Jan. 13, 2017

(65) Prior Publication Data
US 2017/0210425 A1    Jul. 27, 2017

(30) Foreign Application Priority Data

Jan. 25, 2016  (JP) .................................. 2016-011843

(51) Int. Cl.
| | |
|---|---|
| B62D 25/08 | (2006.01) |
| B62D 21/15 | (2006.01) |
| B60R 19/18 | (2006.01) |

(52) U.S. Cl.
CPC ............ *B62D 21/152* (2013.01); *B60R 19/18* (2013.01); *B62D 25/08* (2013.01); *B60R 2019/1806* (2013.01)

(58) Field of Classification Search
CPC ............ B60R 19/18; B60R 2019/1806; B62D 21/152
USPC .................................................... 296/187.09
See application file for complete search history.

(56) References Cited

U.S. PATENT DOCUMENTS

| | | | |
|---|---|---|---|
| 8,596,711 B2 * | 12/2013 | Yasui | ...................... B60R 19/34 296/187.09 |
| 8,789,877 B2 | 7/2014 | Ohnaka et al. | |
| 8,833,838 B2 | 9/2014 | Watanabe | |
| 9,421,865 B2 * | 8/2016 | Bernardi | .............. B60K 5/1275 |
| 2010/0259033 A1 * | 10/2010 | Okabe | ..................... B60R 19/34 280/734 |
| 2011/0148151 A1 * | 6/2011 | Abe | ........................ B60R 19/34 296/203.02 |

(Continued)

FOREIGN PATENT DOCUMENTS

| | | |
|---|---|---|
| JP | 2013-193572 | 9/2013 |
| JP | 5357953 | 9/2013 |

(Continued)

OTHER PUBLICATIONS

Japanese Office Action dated Sep. 8, 2017, partial English translation included, 9 pages.

*Primary Examiner* — Pinel E Romain
(74) *Attorney, Agent, or Firm* — Rankin, Hill & Clark LLP

(57) ABSTRACT

A vehicle front structure includes a first bending portion, a second bending portion, and a third bending portion in a left front side frame. An outer panel of the first bending portion includes a first concave portion. An inner panel of the second bending portion includes a second concave portion. The third bending portion is formed to be concave toward an interior. An inner central wall of the inner panel extends flat to the rear side of the vehicle body toward the second bending portion. A left branch gusset extends to tilt from the inner central wall, and the outer panel is joined to a rear surface of the left branch gusset.

6 Claims, 12 Drawing Sheets

(56) References Cited

U.S. PATENT DOCUMENTS

| | | | | |
|---|---|---|---|---|
| 2012/0153679 A1* | 6/2012 | Yasuhara | ............. | B62D 21/152 |
| | | | | 296/203.02 |
| 2014/0375082 A1* | 12/2014 | Watanabe | ............ | B62D 21/152 |
| | | | | 296/187.1 |
| 2015/0035316 A1* | 2/2015 | Kuriyama | ............ | B62D 25/082 |
| | | | | 296/187.1 |
| 2015/0232050 A1* | 8/2015 | Yamada | .................. | B60R 19/34 |
| | | | | 296/187.1 |
| 2016/0347374 A1* | 12/2016 | Miyamoto | ........... | B62D 21/152 |
| 2017/0217501 A1* | 8/2017 | Takeda | .................... | B60R 19/24 |

FOREIGN PATENT DOCUMENTS

| | | |
|---|---|---|
| JP | 2013-248898 | 12/2013 |
| JP | 2014-184857 | 10/2014 |

\* cited by examiner

VEHICLE FRONT STRUCTURE

BACKGROUND OF THE INVENTION

Field of the Invention

The present invention relates to a vehicle front structure in which a front side frame is provided in a front side portion of a vehicle body, and the front side frame is formed into a closed section by joining an inner panel and an outer panel.

Description of the Related Art

There are known some vehicle front structures in which a fragile portion is formed in each front side frame, and a branch gusset is provided to tilt from the fragile portion outward to the front side of the vehicle body. According to this vehicle front structure, at the time of a small overlap collision, an impact load is input to the branch gusset, and the input impact load acts on the fragile portion of the front side frame via the branch gusset.

By the impact load acting on the fragile portion, the fragile portion is bent into a V shape inward in the vehicle width direction. When the fragile portion is bent, the front side frame deforms, and the impact load is absorbed (see, for example, Japanese Patent No. 5357953).

In the vehicle front structure of Japanese Patent No. 5357953, however, the impact load transmitted to the fragile portion is hardly transmitted to the rear portion of the front side frame. It is therefore difficult to sufficiently deform the rear portion of the front side frame by the impact load. For this reason, it is difficult to increase the absorption amount of impact energy that is input when an impact load is input by a small overlap collision, and there remains room for improvement from this viewpoint.

SUMMARY OF THE INVENTION

The present invention provides a vehicle front structure capable of increasing the absorption amount of impact energy by a small overlap collision.

The present invention provides a vehicle front structure in which a front side frame extends in a vehicle longitudinal direction in a front side portion of a vehicle body, and the front side frame is formed into a closed section by joining an inner panel on an interior side and an outer panel in an exterior side, wherein the front side frame comprises a first bending portion including a first concave portion formed in the outer panel to be concave toward the interior, a second bending portion including a second concave portion formed in the inner panel behind the first bending portion in the vehicle body to be concave toward the exterior, and a third bending portion formed behind the second bending portion in the vehicle body to be concave toward the interior, the inner panel includes an inner central wall extending flat to the rear side of the vehicle body from the first bending portion to the second bending portion, a branch gusset extends to tilt from the inner central wall outward in a vehicle width direction and obliquely to a front side via an inside of the first bending portion, and the outer panel is joined to a rear surface of the branch gusset.

As described above, the inner central wall of the inner panel extends flat to the rear side of the vehicle body from the first bending portion to the second bending portion. In addition, the branch gusset extends to tilt from the inner central wall outward in the vehicle width direction and obliquely to the front side via the inside of the first bending portion.

Furthermore, the outer panel is joined to the rear surface of the branch gusset. Hence, the branch gusset can be formed as a member separated from the outer panel. When the branch gusset is formed as a member separated from the outer panel, the branch gusset can satisfactorily transmit an impact load input to the front end of the branch gusset to the inner central wall.

The inner central wall extends flat to the rear side of the vehicle body from the first bending portion to the second bending portion. In addition, the inner panel of the second bending portion is formed to be concave toward the exterior. Hence, the impact load is satisfactorily transmitted from the inner central wall to the second bending portion, and the second bending portion is preferentially deformed toward the exterior in the vehicle width direction.

In addition, the outer panel of the first bending portion is formed to be concave toward the interior. Furthermore, the third bending portion is formed to be concave toward the interior. Hence, following the deformation of the second bending portion, the first bending portion can be deformed toward the interior in the vehicle width direction, and the third bending portion can be bent toward the exterior in the vehicle width direction.

When the front side frame is bent and deformed almost horizontally in the vehicle width direction at the first bending portion, the second bending portion, and the third bending portion, the absorption amount of the impact energy can be increased. Hence, the absorption amount of the impact energy can particularly be increased in a case in which the impact load is input to the outside of the front side frame, as in the small overlap collision.

In the present invention, preferably, the inner panel comprises an inner wall facing the interior side, an inner upper surface projecting from an upper end of the inner wall to the exterior side, and an inner lower surface projecting from a lower end of the inner wall to the exterior side, the inner panel is formed into a substantially U-shaped section by the inner wall, the inner upper surface, and the inner lower surface, the branch gusset comprises a wall portion, an upper flange projecting from an upper end of the wall portion, a lower flange projecting from a lower end of the wall portion, and a rear flange projecting from a rear end of the wall portion to the rear side of the vehicle body, the branch gusset is formed into a substantially U-shaped section by the wall portion, the upper flange, and the lower flange, the vehicle front structure comprises a connecting portion configured to connect the branch gusset to the inner panel, the connecting portion comprises an upper connecting plate projecting from the inner upper surface toward the branch gusset, and an lower connecting plate projecting from the inner lower surface toward the branch gusset, the upper flange is joined to the inner upper surface and the upper connecting plate, the lower flange is joined to the inner lower surface and the lower connecting plate, and the rear flange faces or is joined to the inner central wall.

As described above, the upper connecting plate projects from the inner upper surface of the inner panel toward the branch gusset, and the upper flange of the branch gusset is joined to the upper connecting plate. In addition, the lower connecting plate projects from the inner lower surface of the inner panel toward the branch gusset, and the lower flange of the branch gusset is joined to the lower connecting plate.

Hence, the branch gusset can firmly be connected to the inner panel via the upper connecting plate and the lower connecting plate. This can prevent the branch gusset from being separated from the inner panel by the impact load input to the branch gusset upon a small overlap collision.

The rear flange of the branch gusset faces or is joined to the inner central wall. Accordingly, the impact load input to the branch gusset can be transmitted from the branch gusset to the inner central wall and then satisfactorily transmitted from the inner central wall to the second bending portion.

In the present invention, preferably, the branch gusset includes a bead formed in a longitudinal direction of the branch gusset.

As described above, when the bead is formed in the longitudinal direction of the branch gusset, the rigidity of the branch gusset can be increased. The impact load input to the branch gusset can thus satisfactorily be transmitted to the side of the inner central wall.

In the present invention, preferably, the connecting portion comprises a support wall portion configured to connect a front end of the upper connecting plate and a front end of the lower connecting plate, the connecting portion is formed into a substantially U-shaped section by the upper connecting plate, the lower connecting plate, and the support wall portion, a bumper beam extension is supported by the support wall portion, and a bumper beam is provided at a front end of the bumper beam extension.

As described above, the connecting portion is formed into an almost U-shaped section by the upper connecting plate, the lower connecting plate, and the support wall portion. Hence, the connecting portion, the inner panel, and the branch gusset can form a box structure. Accordingly, the bumper beam extension (that is, impact absorbing member) can firmly be supported by the support wall portion of the connecting portion, and the support rigidity of the bumper beam extension can be increased.

Hence, the bumper beam extension can suitably be crushed to absorb the impact load in the early stage of the small overlap collision. In addition, in the later stage of the collision, the front side frame is bent and deformed at the first bending portion, the second bending portion, and the third bending portion by the impact load transmitted from the branch gusset, thereby absorbing the impact energy.

Accordingly, with the simple arrangement in which the connecting portion, the inner panel, and the branch gusset form the box structure, the absorption amount of the impact energy can further be increased.

In the present invention, preferably, the third bending portion is formed to have a width in the vehicle width direction larger than widths of the first bending portion and the second bending portion, and is formed to be curved outward in the vehicle width direction from a rear side to a front side of the vehicle body.

As described above, the third bending portion is formed to be curved outward in the vehicle width direction from the rear side to the front side of the vehicle body. Hence, the portions of the front side frame on the sides of the first bending portion and the second bending portion can be arranged outside in the vehicle width direction. Accordingly, the length between the front side frames in the vehicle width direction (that is, the size of the engine room in the vehicle width direction) can be increased, and the space to mount a power unit can be ensured.

In addition, the third bending portion is formed to have a large width in the vehicle width direction. Hence, the impact load input to the front side fame by the small overlap collision can be supported by the third bending portion. It is therefore possible to make the input impact load concentrate to the first bending portion, the second bending portion, and the third bending portion.

Hence, the front side frame can satisfactorily be bent and deformed at the first bending portion, the second bending portion, and the third bending portion, and the absorption amount of the impact energy can further be increased.

In the present invention, preferably, the vehicle front structure further comprises a front pillar provided outside the front side frame in the vehicle width direction, and an upper member extending from the front pillar to tilt to a lower front side in the vehicle body and inward in the vehicle width direction and connected to a front end of the branch gusset, and the upper member and the branch gusset are tilted to be substantially bilaterally symmetrical.

As described above, the upper member and the branch gusset are tilted to be almost bilaterally symmetrical. The impact load input by the small overlap collision can almost evenly be dispersed to the branch gusset and the upper member. Hence, the impact load transmitted to the branch gusset can be absorbed by the bending deformation of the front side frame, and the impact load transmitted to the upper member can be absorbed by the bending deformation of the upper member.

Accordingly, the impact load input by the small overlap collision can be absorbed by the two members, that is, the front side frame and the upper member, and the absorption amount of the impact energy can further be increased.

In the present invention, preferably, the connecting portion comprises an upper joint flange projecting upward from an outer end of the upper connecting plate, and a lower joint flange projecting downward from an outer end of the lower connecting plate, and the upper joint flange and the lower joint flange are joined to a front end of the upper member.

As described above, the upper joint flange and the lower joint flange are formed on the connecting portion, and the upper joint flange and the lower joint flange are joined to the upper member. Hence, an attachment bracket used to join the upper member to the connecting portion is unnecessary, and the number of parts can be decreased.

In addition, a closed section can be formed by the connecting portion, the upper member, and the branch gusset. The connecting portion and the upper member can thus firmly be joined, and the strength/rigidity of the joint portion between the connecting portion and the upper member can be increased.

According to the present invention, when an impact load is input by a small overlap collision to the outside of the front side frame in the vehicle width direction, the front side frame can be bent and deformed to increase the absorption amount of impact energy.

Further features of the present invention will become apparent from the following description of exemplary embodiments (with reference to the attached drawings).

DESCRIPTION OF THE EMBODIMENTS

Figure 1:
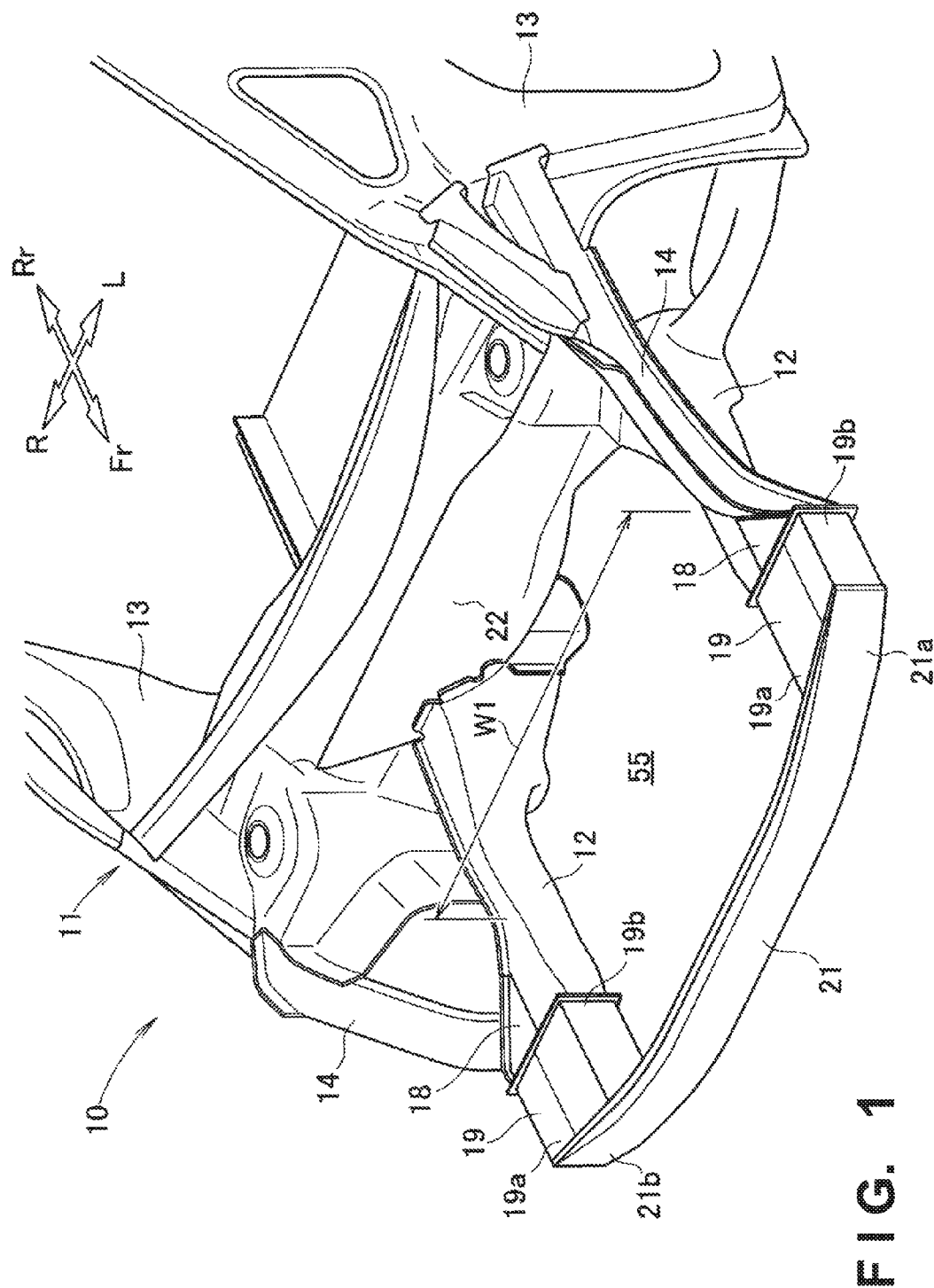
FIG. 1 is a perspective view showing a vehicle front structure according to the present invention.

The best mode for carrying out the present invention will now be described with reference to the accompanying drawings. Note that "front (Fr)", "rear (Rr)", "left (L)", and "right (R)" comply with directions viewed from a driver.

Embodiment

A vehicle front structure 10 according to the embodiment will be described.

Note that the vehicle front structure 10 has an almost bilaterally symmetrical structure. The constituent members on the left side and the constituent members on the right side are denoted by the same reference numerals. The constituent members on the left side will be described below in detail, and a description of the constituent members on the right side will be omitted.

Figure 2:
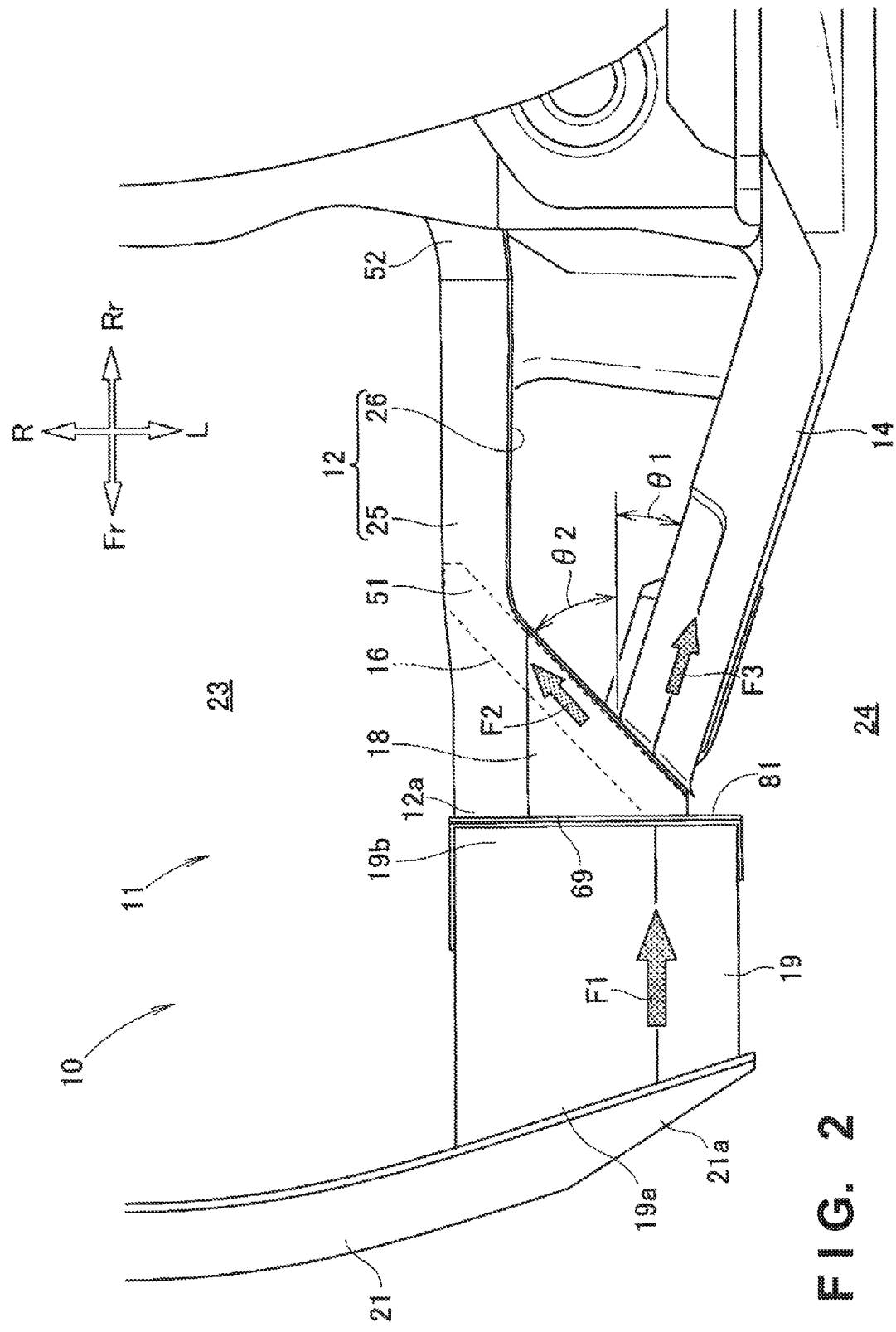
FIG. 2 is a plan view showing the left side portion of the vehicle front structure in FIG. 1.

As shown in FIGS. 1 and 2, the vehicle front structure 10 includes a left front side frame (front side frame) 12 extending in the vehicle longitudinal direction on the left front side (front side) of a vehicle body 11, a left front pillar (front pillar) 13 provided outside the left front side frame 12 in the vehicle width direction, and a left upper member (upper member) 14 extending obliquely from the left front pillar 13 downward to the front side of the vehicle body.

The vehicle front structure 10 also includes a left branch gusset (branch gusset) 16 that connects the left upper member 14 and the left front side frame 12, a left connecting portion (connecting portion) 18 that connects the left branch gusset 16 and the left front side frame 12, a left bumper beam extension (bumper beam extension) 19 provided at a front end 18a of the left connecting portion 18, and a bumper beam 21 bridged over front ends 19a of the left bumper beam extension 19 and the right bumper beam extension 19.

Figure 3:
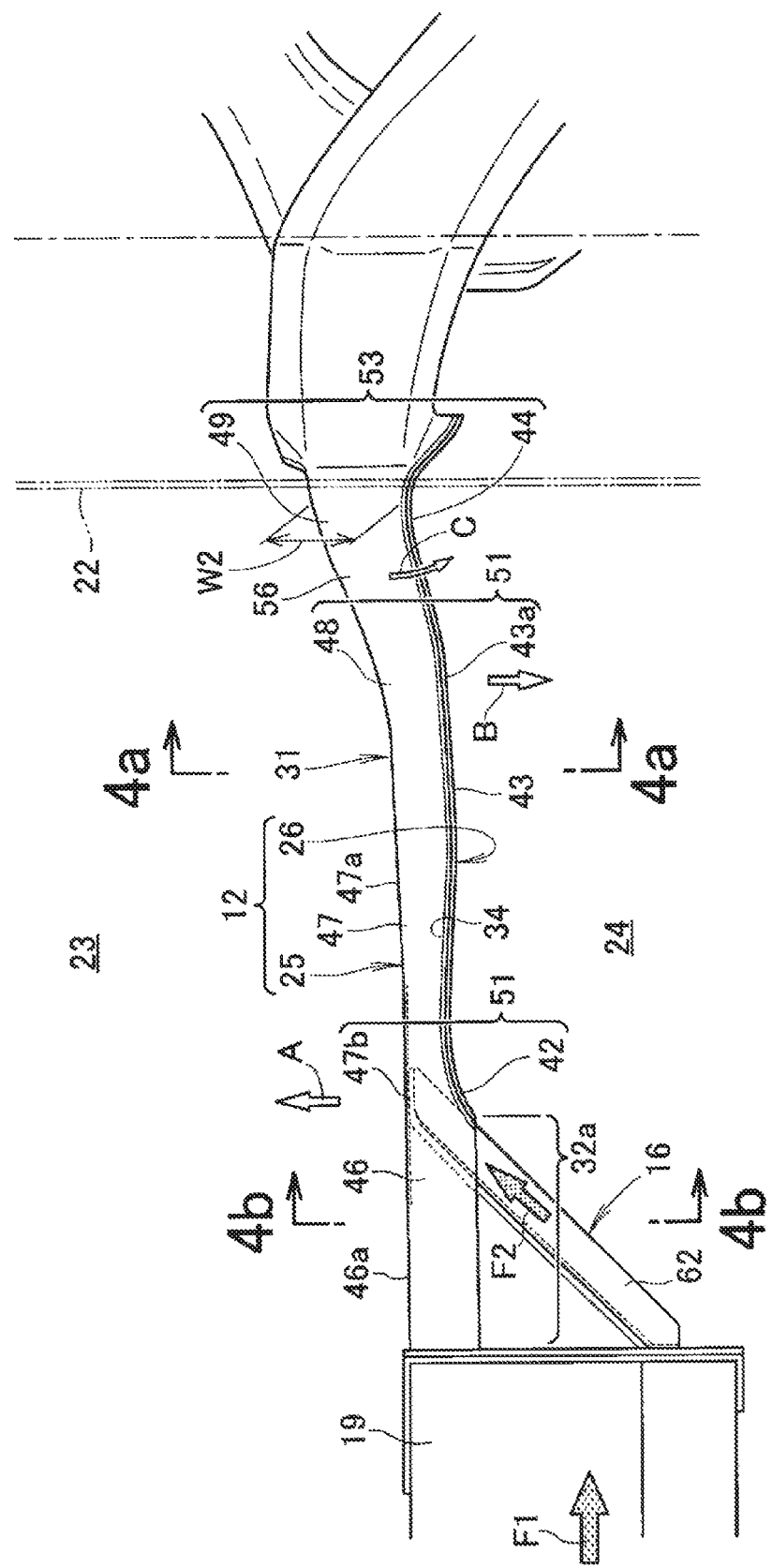
FIG. 3 is a plan view showing a left front side frame and a left branch gusset in FIG. 2.

As shown in FIG. 3, the left front side frame 12 is a member that extends from below on the left side of a lower dash panel 22 to the front side of the vehicle body and forms the framework of the vehicle body 11. The left front side frame 12 includes an inner panel 25 arranged on the side of an interior 23, and an outer panel 26 arranged on the side of an exterior 24.

Figure 4A:
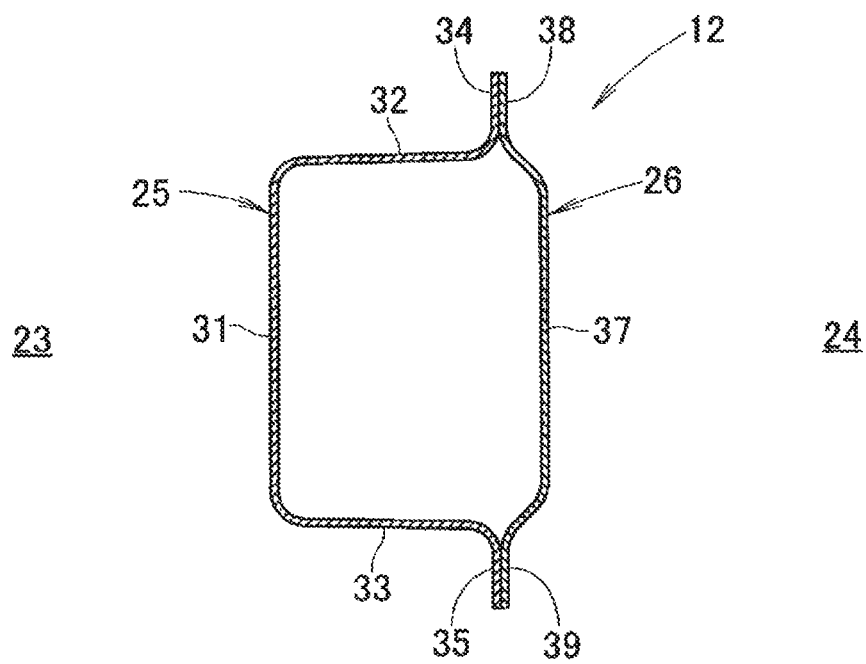
FIG. 4A is a sectional view taken along a line 4a-4a in FIG. 3.
Figure 4B:
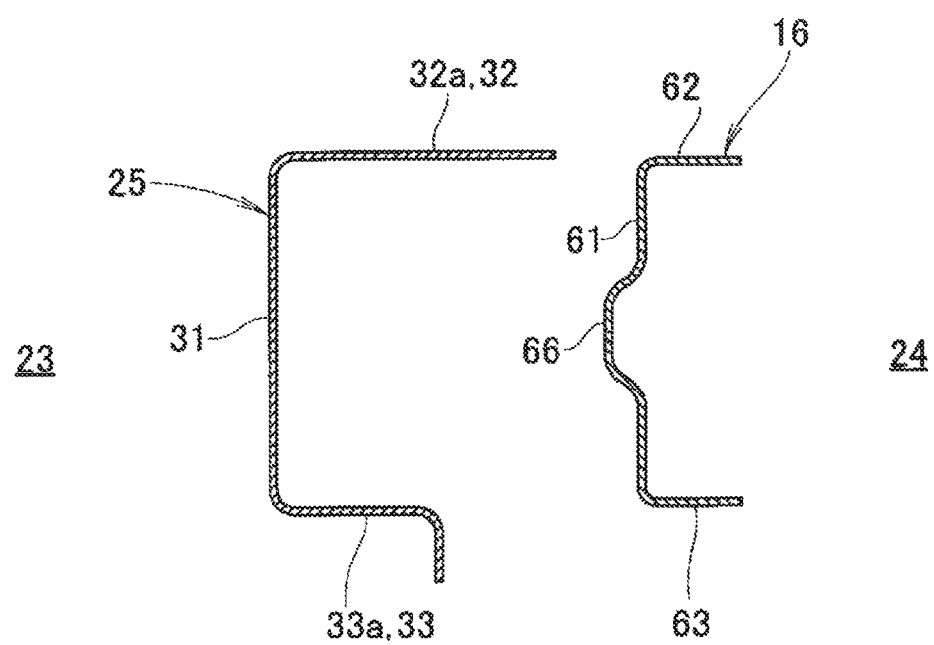
FIG. 4B is a sectional view taken along a line 4b-4b in FIG. 3.

As shown in FIGS. 4A and 4B, the inner panel 25 includes an inner wall 31 facing the side of the interior 23, an inner upper surface 32 projecting from the upper end of the inner wall 31 to the side of the exterior 24, an inner lower surface 33 projecting from the lower end of the inner wall 31 to the side of the exterior 24, an upper flange 34 projecting upward from the outer end of the inner upper surface 32, and a lower flange 35 projecting downward from the outer end of the inner lower surface 33.

The upper flange 34 is formed on a portion of the inner upper surface 32 except a front portion 32a (see FIG. 3). The front portion 32a of the inner upper surface 32 will be referred to as "inner front upper surface 32a" hereinafter. In addition, a front portion 33a of the inner lower surface 33 will be referred to as "inner front lower surface 33a".

The inner panel is formed into an almost U-shaped section by the inner wall 31, the inner upper surface 32, and the inner lower surface 33.

The inner wall 31 faces the side of the interior 23, thereby forming the inner wall of the left front side frame 12.

The outer panel 26 includes an outer wall portion 37 facing the side of the exterior 24, an upper flange 38 projecting upward from the upper end of the outer wall portion 37, and a lower flange 39 projecting downward from the lower end of the outer wall portion 37. The outer wall portion 37 of the outer panel 26 forms the outer wall of the left front side frame 12.

The upper flange 34 of the inner panel 25 and the upper flange 38 of the outer panel 26 are joined. In addition, the lower flange 35 of the inner panel 25 and the lower flange 39 of the outer panel 26 are joined. The left front side frame 12 is thus formed by the inner panel 25 and the outer panel 26 into a closed section having an almost rectangular sectional shape.

Figure 5:
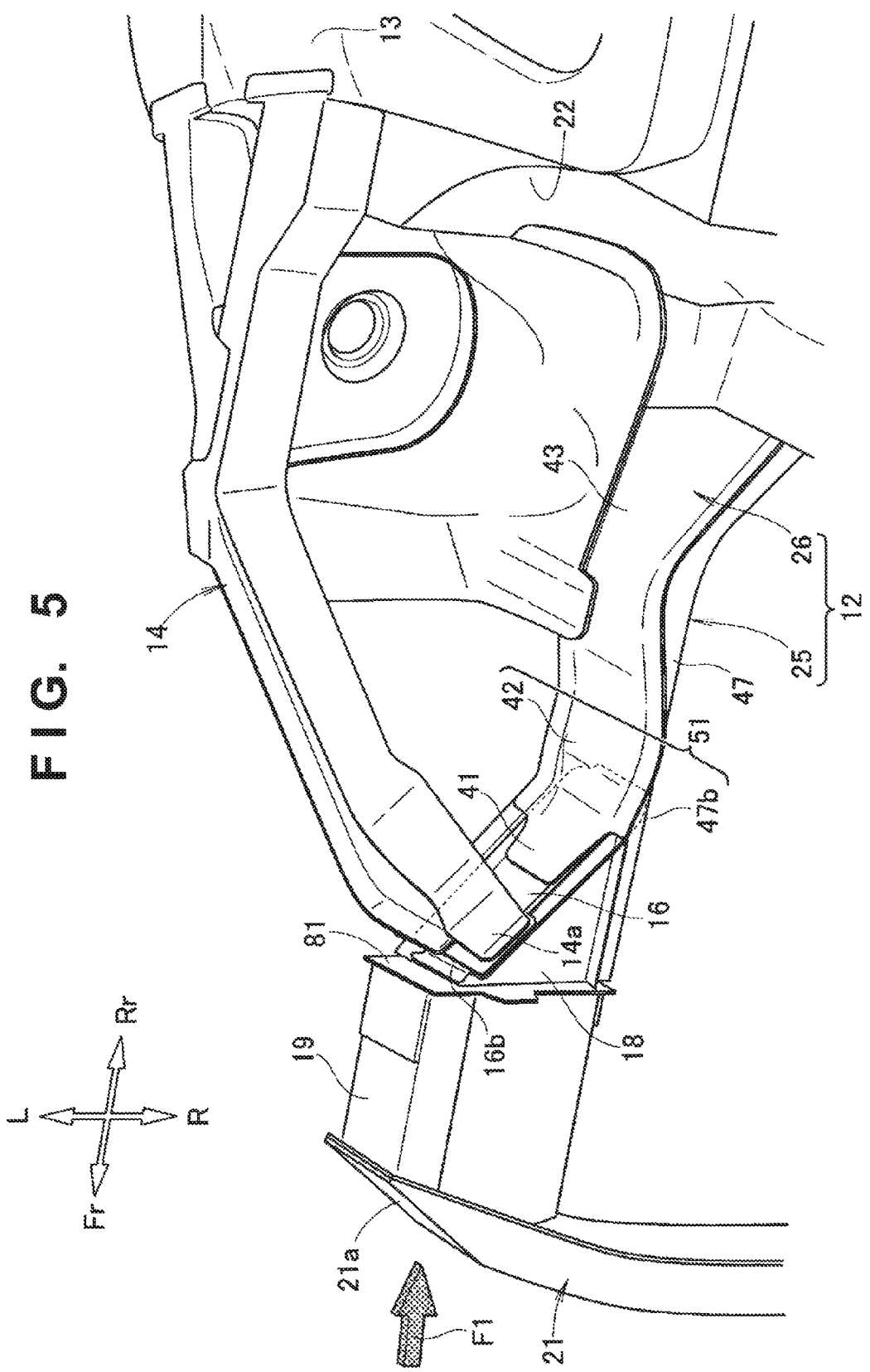
FIG. 5 is a perspective view showing a state in which the left side portion of the vehicle front structure in FIG. 2 is viewed from the lower rear side.
Figure 6:
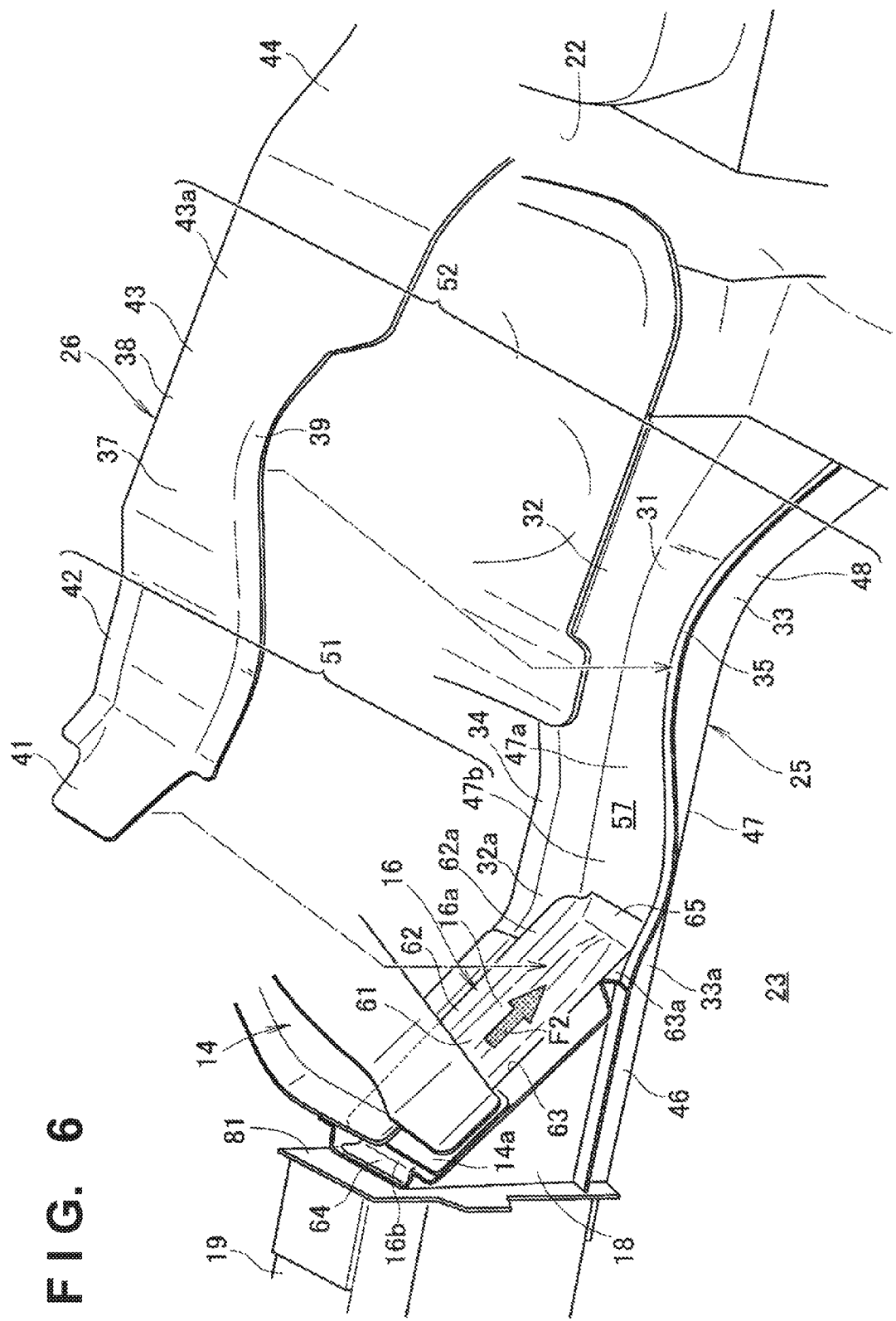
FIG. 6 is an exploded perspective view of the left front side frame in FIG. 5.

As shown in FIGS. 5 and 6, the outer panel 26 includes a front tilt portion 41 that forms the front portion, a first concave portion 42 formed behind the front tilt portion 41 in the vehicle body, a linear portion 43 formed behind the first concave portion 42 in the vehicle body, and a third outer concave portion (see FIG. 3 as well) formed behind the linear portion 43 in the vehicle body.

The front tilt portion 41 extends to tilt along the left branch gusset 16. The front tilt portion 41 is joined to a rear surface 16a of the left branch gusset 16. The first concave portion 42 is formed behind the front tilt portion 41 in the vehicle body to be concave toward the interior 23. The linear portion 43 extends flat from the first concave portion 42 to the rear side of the vehicle body. The third outer concave portion 44 is formed behind the linear portion 43 in the vehicle body to be concave toward the interior 23 (see FIG. 3 as well).

As shown in FIGS. 3 and 6, the inner panel 25 includes a front linear portion 46 that forms the front portion, a central linear portion 47 extending flat from the front linear portion 46 to the rear side of the vehicle body, a second concave portion 48 formed behind the central linear portion 47 in the vehicle body, and a third inner concave portion 49 formed behind the second concave portion 48 in the vehicle body.

The front linear portion 46 includes a front inner linear wall 46a extending flat to the rear side of the vehicle body. The central linear portion 47 includes an inner central wall 47a extending flat from the front inner linear wall 46a to the rear side of the vehicle body. More specifically, the inner central wall 47a extends flat to the rear side of the vehicle body from a first bending portion 51 to a second bending portion 52 (both will be described later).

In addition, the second concave portion 48 is formed behind the inner central wall 47a in the vehicle body to be concave toward the exterior 24. The third inner concave portion 49 is formed behind the second concave portion 48 in the vehicle body to be concave toward the interior 23.

The left front side frame 12 includes the first bending portion 51, the second bending portion 52, and a third bending portion 53. The first bending portion 51 is formed by the first concave portion 42 and a front half portion 47b of the central linear portion 47 into a closed section having an almost rectangular sectional shape. The first bending portion 51 has the first concave portion 42 on the side of the exterior 24 and the inner central wall 47a on the side of the interior 23.

Hence, by an impact load F1 input upon a small overlap collision, the first bending portion 51 is bent into an almost V shape inward (that is, to the side of the interior 23) in the vehicle width direction, as indicated by an arrow A.

The small overlap collision means that the outer front side portion of the left front side frame 12 corresponding to ¼ of the front portion of the vehicle in the vehicle width direction collides against an obstacle such as a standing tree or pole. Note that the small overlap collision is also called a small lap collision or a narrow offset collision.

The second bending portion 52 is formed by a rear half portion 43a of the linear portion 43 and the second concave portion 48 into a closed section having an almost rectangular sectional shape. The second bending portion 52 is located behind the first bending portion 51 in the vehicle body, and has the second concave portion 48 on the side of the interior 23 and the rear half portion 43a of the linear portion 43 on the side of the exterior 24.

Hence, by the impact load F1 input upon the small overlap collision, the second bending portion 52 is bent into an almost V shape outward (that is, to the side of the exterior 24) in the vehicle width direction, as indicated by an arrow B.

The third bending portion 53 is formed by the third outer concave portion 44 and the third inner concave portion 49 into a closed section having an almost rectangular sectional shape. The third bending portion 53 is located behind the second bending portion 52 in the vehicle body, and has the third outer concave portion 44 on the side of the exterior 24 and the third inner concave portion 49 on the side of the interior 23. That is, the third bending portion 53 is formed to be concave toward the interior 23.

The third bending portion 53 is thus formed to be curved outward in the vehicle width direction from the rear side to the front side of the vehicle body. Accordingly, the portions of the left front side frame 12 on the sides of the first bending portion 51 and the second bending portion 52 can be arranged to extend toward the exterior 24 (that is, outward in the vehicle width direction).

Hence, as shown in FIG. 1, a length W1 between the left front side frame 12 and the right front side frame 12 in the vehicle width direction is ensured largely. Hence, the size of an engine room 55 in the vehicle width direction can be increased, and the space to mount a power unit is ensured.

Referring back to FIG. 3, the third bending portion 53 is formed such that a width W2 in the vehicle width direction becomes larger than the widths of the first bending portion 51 and the second bending portion 52. Hence, the third bending portion 53 can support the impact load F1 input by the small overlap collision. It is therefore possible to make the input impact load F1 concentrate to the first bending portion 51, the second bending portion 52, and the third bending portion 53.

Hence, the left front side frame 12 can satisfactorily be bent and deformed at the first bending portion 51, the second bending portion 52, and the third bending portion 53, and the absorption amount of the impact energy can be increased.

A rear end 53a of the third bending portion 53 is supported by the lower dash panel 22. Hence, by the impact load F1 input upon the small overlap collision, a frame portion 56 between the second bending portion 52 and the third bending portion 53 is bent from the third bending portion 53 serving as a fulcrum outward (that is, to the side of the exterior 24) in the vehicle width direction, as indicated by an arrow C.

As shown in FIG. 5, the left front pillar 13 is provided outside the left front side frame 12 in the vehicle width direction. The left upper member 14 extends from the left front pillar 13 toward the left branch gusset 16 to tilt to the lower front side in the vehicle body and also inward in the vehicle width direction. A front end 14a of the left upper member 14 is connected to a front end 16b of the left branch gusset 16.

The left upper member 14 is a member that is formed into an almost rectangular sectional shape and is bent and deformed by the impact load F1 input upon the small overlap collision to absorb the impact load F1.

As shown in FIG. 6, the left branch gusset 16 extends to tilt from the first bending portion 51 of the left front side frame 12. The left branch gusset 16 extends to tilt from the inner central wall 47a outward in the vehicle width direction and also obliquely to the front side via an inside 57 of the first bending portion 51.

Figure 7:
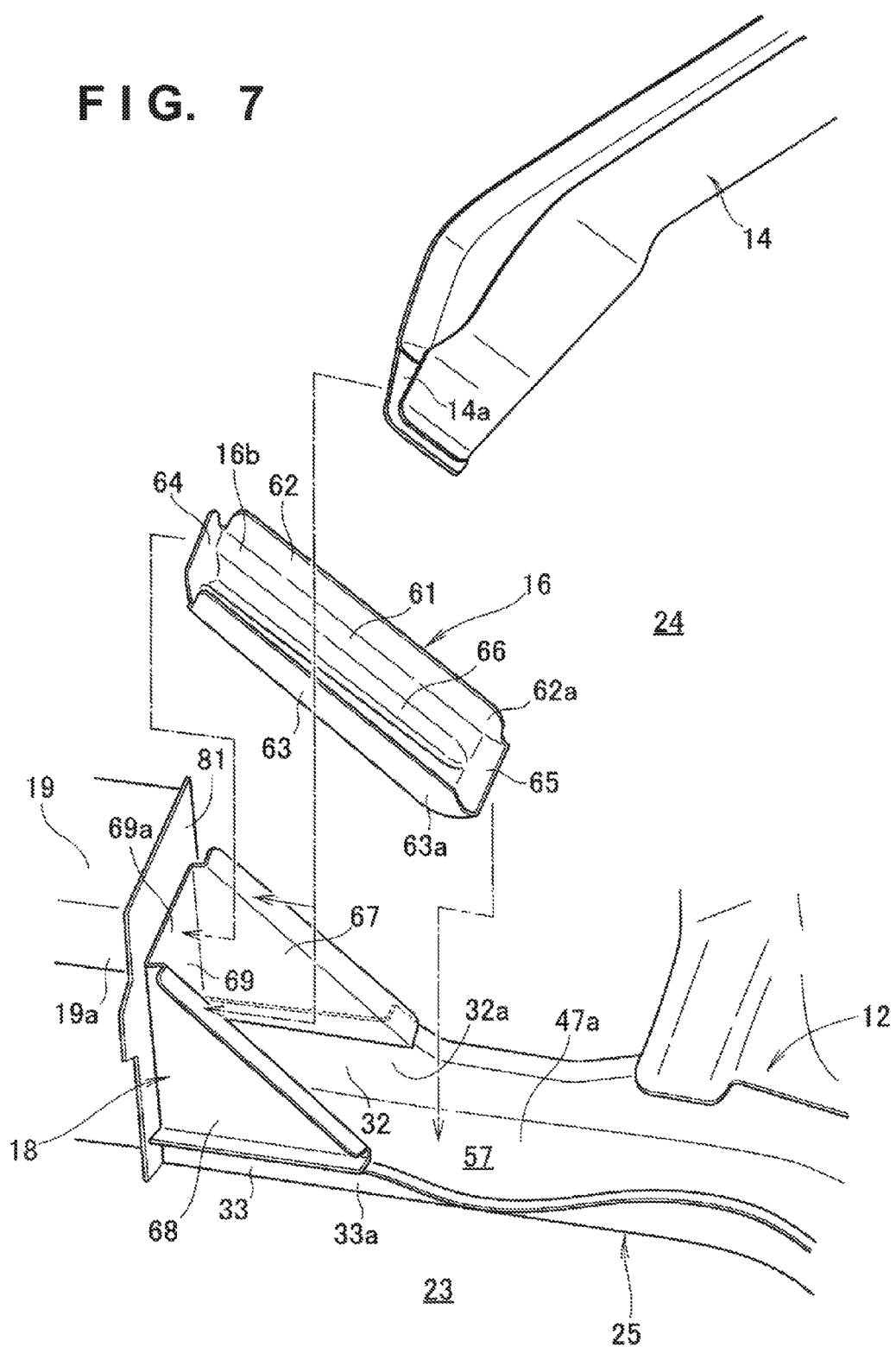
FIG. 7 is an exploded perspective view showing a state in which the left branch gusset and a left upper member are disassembled from the left front side frame in FIG. 6.
Figure 8:
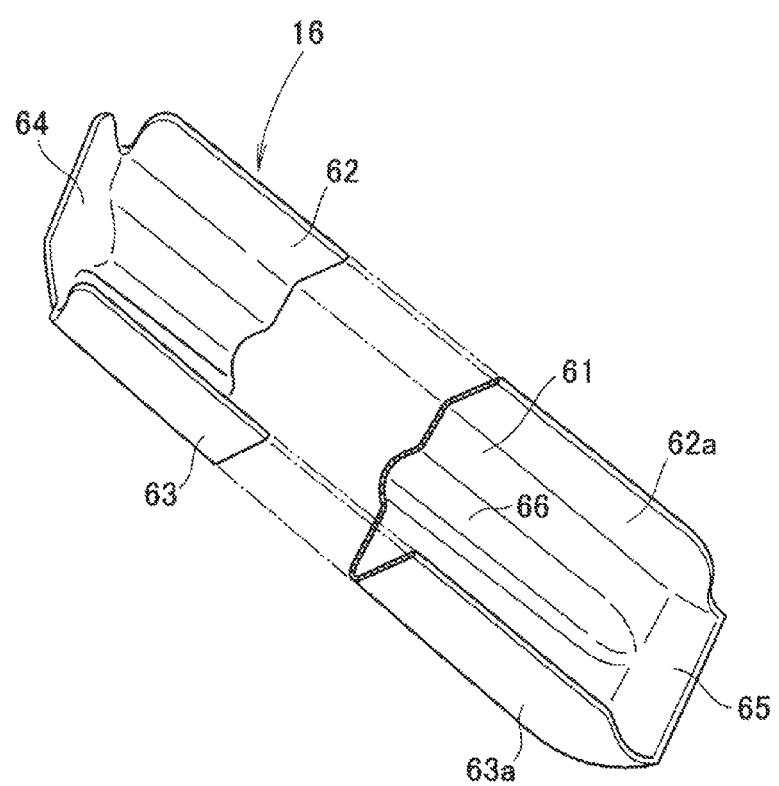
FIG. 8 is a perspective view showing the left branch gusset in FIG. 7.

As shown in FIGS. 7 and 8, the left branch gusset 16 includes a gusset wall portion (wall portion) 61, an upper joint piece (upper flange) 62, a lower joint piece (lower flange) 63, a front joint piece 64, and a rear joint piece (rear flange) 65. The left branch gusset 16 is formed into an almost U-shaped section by the gusset wall portion 61, the upper joint piece 62, and the lower joint piece 63.

The gusset wall portion 61 extends to tilt from the inner central wall 47a to a read end 19b of the left bumper beam extension 19 outward in the vehicle width direction and also obliquely to the front side. A bead 66 is formed on the gusset wall portion 61. The bead 66 is formed to be concave to the side of the interior 23 and extends in the longitudinal direction of the gusset wall portion 61.

When the bead 66 is formed in the longitudinal direction of the left branch gusset 16, the rigidity of the left branch gusset 16 is increased. The impact load input to the left branch gusset 16 is thus satisfactorily transmitted to the side of the inner central wall 47a.

The upper joint piece 62 is bent to project from the upper end of the gusset wall portion 61 toward the exterior. A rear portion 62a of the upper joint piece 62 is joined from below to the inner front upper surface 32a. The lower joint piece 63 is bent to project from the lower end of the gusset wall portion 61 toward the exterior. A rear portion 63a of the lower joint piece 63 is joined from below to the inner front lower surface 33a.

The front joint piece 64 is bent to project from the front end of the gusset wall portion 61 toward the exterior 24. The front joint piece 64 is joined from the rear side of the vehicle body to an outer end joint portion 69a of a support wall portion 69 of the left connecting portion 18.

The rear joint piece 65 is bent to project from the rear end of the gusset wall portion 61 to the rear side of the vehicle body. The rear joint piece 65 is joined from the side of the exterior 24 to the inner central wall 47a.

Referring back to FIG. 6, the front tilt portion 41 of the outer panel 26 is joined to the inner surface of the upper joint piece 62, the inner surface of the lower joint piece 63, and the rear surface of the gusset wall portion 61. That is, the left branch gusset 16 is formed as a member separated from the outer panel 26.

When the left branch gusset 16 is formed as a member separated from the outer panel 26, an impact load F2 input to the front end 16b of the left branch gusset 16 can satisfactorily be transmitted to the inner central wall 47a.

The inner central wall 47a extends flat to the rear side of the vehicle body from the first bending portion 51 to the second bending portion 52. Hence, the impact load F2 is satisfactorily transmitted to the second bending portion 52 via the inner central wall 47a.

As shown in FIG. 3, the second concave portion 48 of the second bending portion 52 is formed to be concave toward the exterior 24. Hence, by the impact load F2 transmitted to the second bending portion 52, the second bending portion 52 is preferentially bent toward the exterior 24, as indicated by the arrow B.

In addition, the first concave portion 42 of the first bending portion 51 is formed to be concave toward the interior 23. Furthermore, the third outer concave portion 44 of the third bending portion 53 is formed to be concave toward the interior 23. Hence, following the deformation of the second bending portion 52, the first bending portion 51 is bent toward the interior 23, as indicated by the arrow A, and the frame portion 56 is bent from the third bending portion 53 serving as a fulcrum toward the exterior 24, as indicated by the arrow C.

When the left front side frame 12 is bent and deformed horizontally in the vehicle width direction at the first bending portion 51, the second bending portion 52, and the third bending portion 53, the absorption amount of the impact energy can be increased. Accordingly, the absorption amount of the impact energy can particularly be increased in a case in which the impact load F1 is input to the outside of the left front side frame 12, as in the small overlap collision.

Referring back to FIG. 7, the left branch gusset 16 is connected to the inner panel 25 of the left front side frame 12 by the left connecting portion 18. The left connecting portion 18 includes an upper connecting plate 67 projecting from the inner upper surface 32 of the inner panel 25, a lower connecting plate 68 projecting from the inner lower surface 33 of the inner panel 25, and a support wall portion 69 (see FIG. 9 as well) that connects the upper connecting plate 67 and the lower connecting plate 68.

Figure 9:
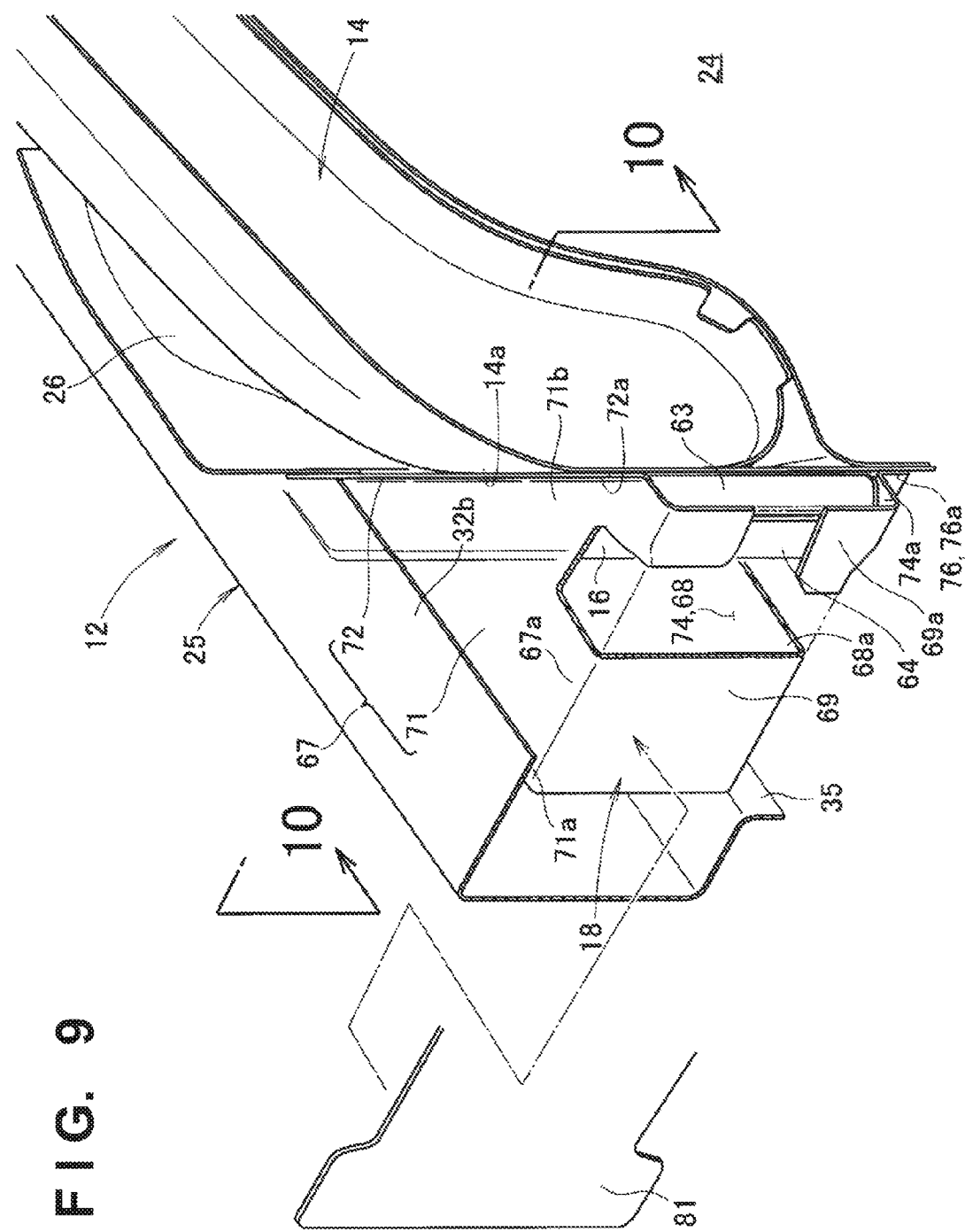
FIG. 9 is an exploded perspective view showing the main part of the left side portion of the vehicle front structure in FIG. 1.
Figure 10:
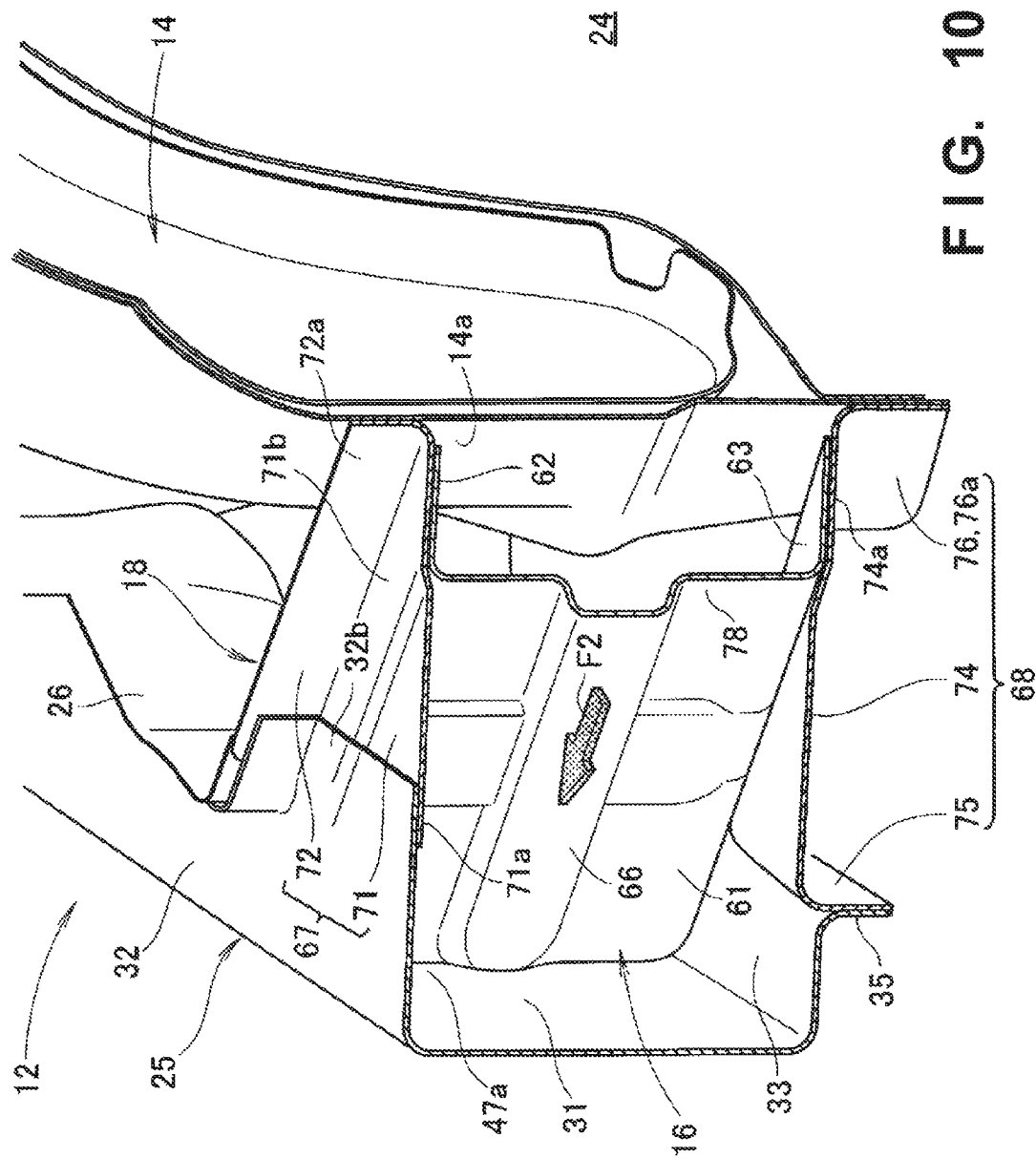
FIG. 10 is a sectional view taken along a line 10-10 in FIG. 9.

As shown in FIGS. 9 and 10, the upper connecting plate 67 includes an upper plate portion 71 formed flat into an almost triangular shape in a plan view, and an upper joint flange 72 formed at the outer end of the upper plate portion 71.

The upper plate portion 71 projects from an outer joint piece 32b of the inner front upper surface 32a toward the upper joint piece 62 of the left branch gusset 16. An inner joint piece 71a of the upper plate portion 71 is joined from below to the outer joint piece 32b.

An outer joint piece 71b of the upper plate portion 71 is joined from above to a portion of the upper joint piece 62 of the left branch gusset 16 except the rear portion 62a (see FIG. 7).

The rear portion 62a of the upper joint piece 62 is joined from below to the inner front upper surface 32a (see FIG. 7). Hence, the upper joint piece 62 is joined to the inner front upper surface 32a and the outer joint piece 71b.

The upper joint flange 72 is bent to project upward from the outer joint piece 71b (the outer end of the upper connecting plate) of the upper plate portion 71. A front half portion 72a of the upper joint flange 72 is jointed to the front end 14a of the left upper member 14.

The lower connecting plate 68 includes a lower plate portion 74 formed flat into an almost triangular shape in a plan view, a lower inner joint flange 75 formed at the inner end of the lower plate portion 74, and a lower outer joint flange (lower joint flange) 76 formed at the outer end of the lower plate portion 74.

The lower inner joint flange 75 is bent to project downward from the inner end of the lower plate portion 74. The lower inner joint flange 75 is joined from the side of the exterior 24 to the lower flange 35 of the inner panel 25.

The lower plate portion 74 projects from the upper end of the lower inner joint flange 75 toward the lower joint piece 63 of the left branch gusset 16. In other words, the lower plate portion 74 projects from the inner lower surface 33 toward the lower joint piece 63 of the left branch gusset 16.

An outer joint piece 74a of the lower plate portion 74 is joined from above to a portion of the lower joint piece 63 of the left branch gusset 16 except the rear portion 63a (see FIG. 7).

The rear portion 63a of the lower joint piece 63 is joined from below to the inner front lower surface 33a (see FIG. 7). Hence, the lower joint piece 63 is joined to the inner front lower surface 33a and the outer joint piece 74a.

Hence, the left branch gusset 16 is firmly connected to the inner front upper surface 32a of the inner panel 25 via the upper connecting plate 67 and the lower connecting plate 68. This can prevent the left branch gusset 16 from being separated from the inner panel 25 by the impact load F2 input to the left branch gusset 16 upon a small overlap collision.

Referring back to FIG. 6, the rear joint piece 65 of the left branch gusset 16 is joined to the inner central wall 47a. The impact load F2 input to the left branch gusset 16 is thus transmitted from the left branch gusset 16 to the inner central wall 47a. In addition, the impact load F2 transmitted to the inner central wall 47a is satisfactorily transmitted to the second bending portion 52 via the inner central wall 47a.

As shown in FIGS. 9 and 10, the lower outer joint flange 76 is bent to project downward from the outer joint piece (the outer end of the lower plate portion) 74a of the lower plate portion 74. A front half portion 76a of the lower outer joint flange 76 is jointed to the front end 14a of the left upper member 14.

The front half portion 72a of the upper joint flange 72 is joined to the front end 14a of the left upper member 14. In this way, the front half portion 72a of the upper joint flange 72 and the front half portion 76a of the lower outer joint flange 76 are joined to the front end 14a of the left upper member 14.

Hence, the front end 14a of the left upper member 14 is connected to the front end 16b of the left branch gusset 16 via the upper connecting plate 67 and the lower connecting plate 68.

When the upper joint flange 72 and the lower outer joint flange 76 are joined to the left upper member 14, a dedicated attachment bracket used to join the left upper member 14 to the left connecting portion 18 is unnecessary. It is therefore possible to decrease the number of parts and simplify the arrangement.

In addition, a closed section portion 78 is formed into an almost rectangular sectional shape by the left connecting portion 18, the left upper member (more specifically, the front end 14a), and the left branch gusset 16. The left connecting portion 18 and the left upper member 14 are thus firmly joined, and the strength/rigidity of the joint portion between the left connecting portion 18 and the left upper member 14 can be increased.

In this state, as shown in FIG. 2, the left upper member 14 and the left branch gusset 16 are tilted to be almost bilaterally symmetrical with respect to the vehicle width direction. More specifically, the left upper member 14 is provided to tilt toward the exterior 24 at a tilt angle θ1 in the horizontal direction from the front side to the rear side of the vehicle body. In addition, the left branch gusset 16 is provided to tilt toward the interior 23 at a tilt angle θ2 in the horizontal direction from the front side to the rear side of the vehicle body.

Hence, the impact load F1 input by the small overlap collision is almost evenly dispersed to the left branch gusset 16 as the impact load F2 and the left upper member 14 as an impact load F3. Accordingly, the impact load F2 transmitted to the left branch gusset 16 can be absorbed by the bending deformation of the left front side frame 12, and the impact load F3 transmitted to the left upper member 14 can be absorbed by the bending deformation of the left upper member 14.

In this way, the impact load F1 input by the small overlap collision can be absorbed by the two members, that is, the left front side frame 12 and the left upper member 14, and the absorption amount of the impact energy can be increased.

As shown in FIG. 9, a front end 67a of the upper connecting plate 67 and a front end 68a of the lower connecting plate 68 are connected by the support wall portion 69. The support wall portion 69 is formed into an almost rectangular shape in a front view, and the front joint piece 64 of the left branch gusset 16 is joined to the outer end joint portion 69a from the rear side of the vehicle body (see FIG. 7 as well).

The left connecting portion 18 is formed into an almost U-shaped section in the vehicle longitudinal direction by the upper connecting plate 67, the lower connecting plate 68, and the support wall portion 69. Hence, the left connecting portion 18, the inner panel 25, and the left branch gusset 16 form a box structure having an almost trapezoidal shape in a plan view. The left connecting portion 18, the inner panel 25, and the left branch gusset 16 are thus firmly connected.

In addition, an attachment bracket 81 is provided on the support wall portion 69 and a front end 12a of the left front side frame 12.

Referring back to FIG. 2, the read end 19b of the left bumper beam extension 19 is attached to the attachment bracket 81. That is, the left bumper beam extension 19 is supported by the support wall portion 69 and the front end 12a of the left front side frame 12 via the attachment bracket 81.

The left connecting portion 18, the inner panel 25, and the left branch gusset 16 form a box structure having an almost trapezoidal shape in a plan view. Hence, the left bumper beam extension 19 is firmly supported by the support wall portion 69 of the left connecting portion 18 and the inner panel 25. This raises the support rigidity of the left bumper beam extension 19.

The left bumper beam extension 19 is a crush box or impact absorbing member capable of absorbing an impact load. Hence, when the support rigidity of the left bumper beam extension 19 is raised, the left bumper beam extension 19 can suitably be crushed to absorb the impact load F1 in the early stage of the small overlap collision.

As described above, with the simple arrangement in which the left connecting portion 18, the inner panel 25, and the left branch gusset 16 form the box structure, the left bumper beam extension 19 can suitably be crushed to absorb the impact load F1 in the early stage of the small overlap collision.

Referring back to FIG. 1, the bumper beam 21 is bridged over the front end 19a of the left bumper beam extension 19 and the front end 19a of the right bumper beam extension 19. That is, a left end 21a of the bumper beam 21 is provided at the front end 19a of the left bumper beam extension 19. In addition, a right end 21b of the bumper beam 21 is provided at the front end 19a of the right bumper beam extension 19.

An example in which the impact load of a small overlap collision is absorbed by the vehicle front structure 10 will be described next with reference to FIGS. 1 to 12.

Figure 11A:
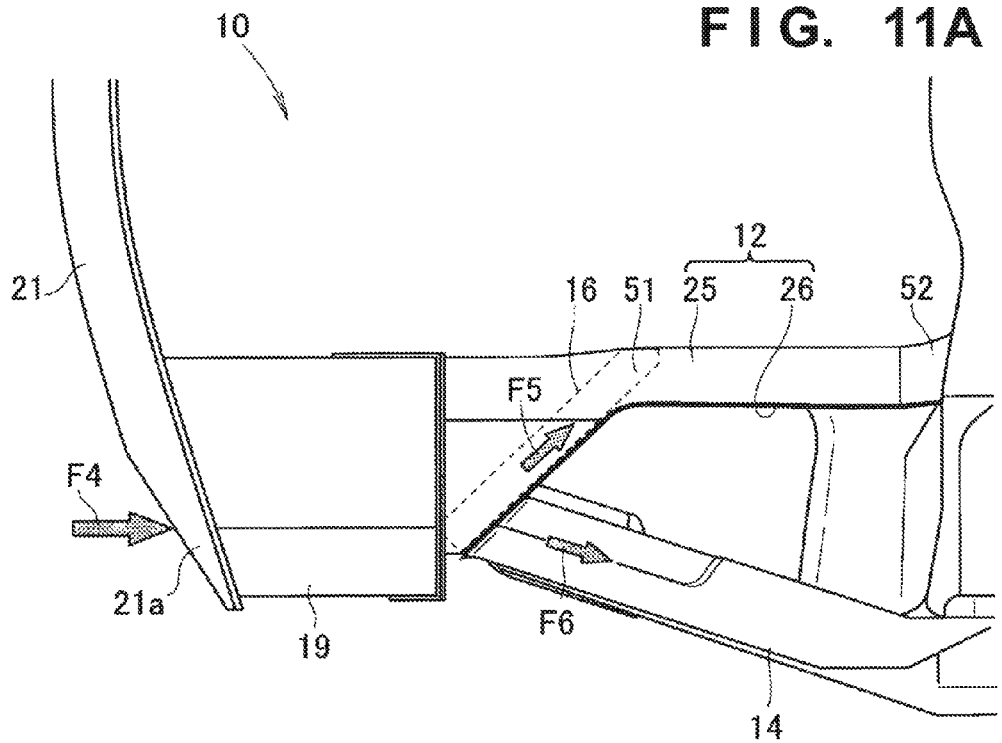
FIGS. 11A and 11B show views for explaining an example in which the impact load of a small overlap collision is transmitted to the vehicle front structure according to the present invention.

As shown in FIG. 11A, in the early stage of a small overlap collision, an impact load F4 is input by the small overlap collision to the left end 21a of the bumper beam 21. The impact load F4 input to the left end 21a is transmitted to the left bumper beam extension 19.

Figure 11B:
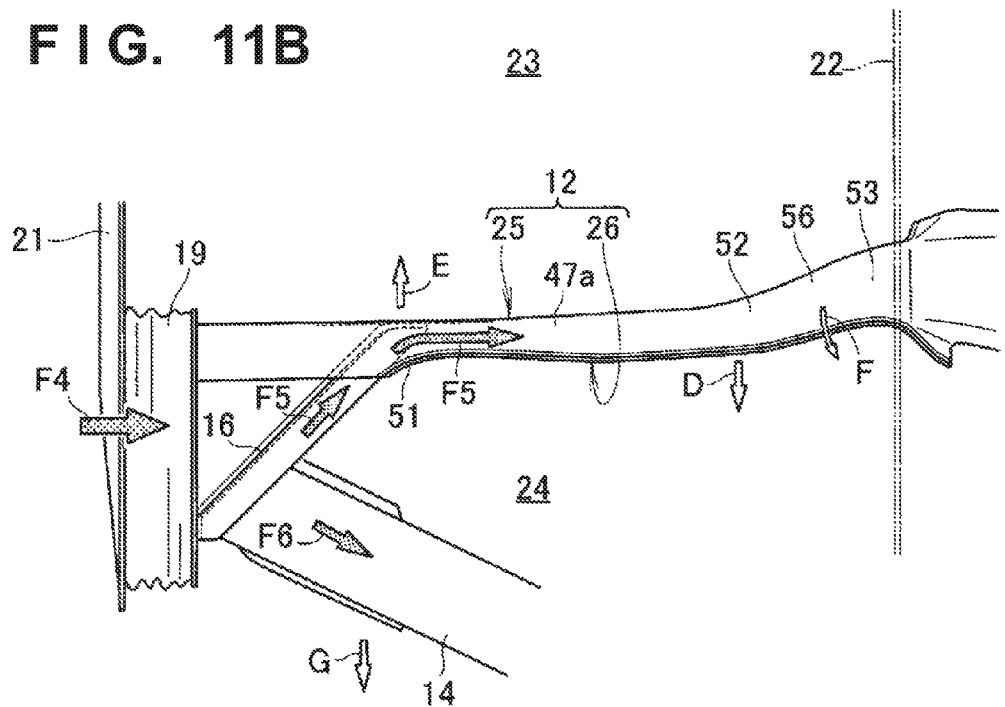

As shown in FIG. 11B, when the impact load F4 is transmitted to the left bumper beam extension 19, the left bumper beam extension 19 is crushed (axially collapsed) by the impact load F4. When the left bumper beam extension 19 is crushed, part of the impact load F1 is absorbed.

After part of the impact load F4 is absorbed by the left bumper beam extension 19, in the later stage of the small overlap collision, the remaining load of the impact load F1 is almost evenly dispersed to the left branch gusset 16 and the left upper member 14.

More specifically, the remaining load of the impact load F1 is dispersed to the left branch gusset 16 as an impact load F5 and the left upper member 14 as an impact load F6.

The impact load F5 transmitted to the left branch gusset 16 is transmitted to the second bending portion 52 via the inner central wall 47a of the left front side frame 12. By the impact load F5 transmitted to the second bending portion 52, the second bending portion 52 is preferentially bent toward the exterior 24, as indicated by an arrow D.

Following the deformation of the second bending portion 52, the first bending portion 51 is bent toward the interior 23, as indicated by an arrow E. In addition, the frame portion 56 is bent from the third bending portion 53 serving as a fulcrum toward the exterior 24, as indicated by an arrow F.

When the impact load F6 is transmitted to the left upper member 14, the left upper member 14 is bent toward the exterior 24 by the impact load F6, as indicated by an arrow G.

Figure 12:
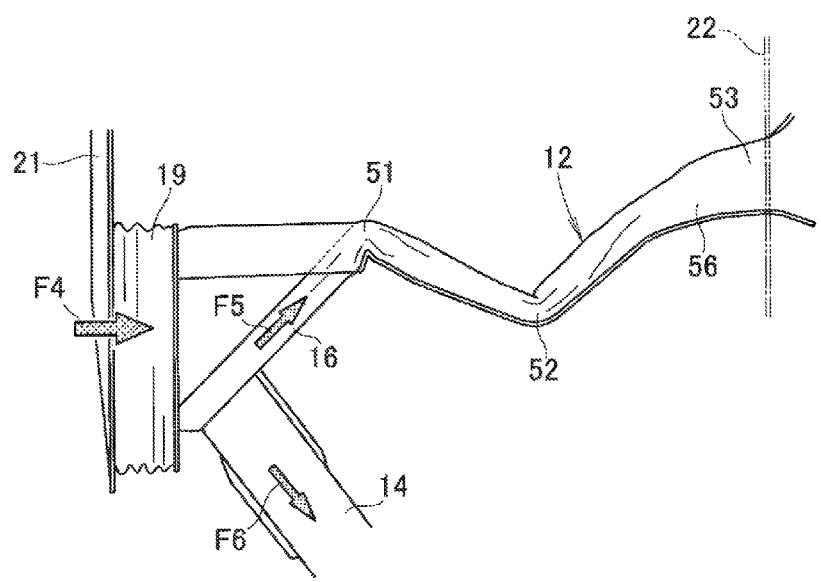
FIG. 12 is a view for explaining an example in which the impact load of a small overlap collision is absorbed by the vehicle front structure according to the present invention.

As shown in FIG. 12, the left front side frame 12 is bent and deformed almost horizontally in the vehicle width direction at the second bending portion 52, the first bending portion 51, and the third bending portion 53. Hence, the impact load F5 transmitted to the left branch gusset 16 can be absorbed by the bending deformation of the left front side frame 12.

The left upper member 14 is deformed by the impact load F6 transmitted to the left upper member 14. The impact load F6 can thus be absorbed by the bending deformation of the left upper member 14.

As described above, according to the vehicle front structure 10, the left bumper beam extension 19 can be crushed to absorb part of the impact load F4 in the early stage of the small overlap collision.

Additionally, in the later stage of the small overlap collision, the remaining load of the impact load F4 can almost evenly be dispersed to the left branch gusset 16 and the left upper member 14. The impact load F5 dispersed to the left branch gusset 16 can be absorbed by the bending deformation of the left front side frame 12. In addition, the impact load F6 dispersed to the left upper member 14 can be absorbed by the bending deformation of the left upper member 14.

This makes it possible to increase the absorption amount of the impact energy by the small overlap collision.

Note that the vehicle front structure according to the present invention is not limited to the above-described embodiment, and changes and improvements can appropriately be made.

For example, in the embodiment, an example in which the rear joint piece 65 of the left branch gusset 16 is joined to the inner central wall 47a has been described. However, the present invention is not limited to this, and the rear joint piece 65 of the left branch gusset 16 may face the inner central wall 47a at a predetermined interval.

Even in this state, the impact load input to the left branch gusset 16 can satisfactorily be transmitted to the inner central wall 47a. Accordingly, the left front side frame 12 can satisfactorily be bent at the first bending portion 51, the second bending portion 52, and the third bending portion 53.

In the embodiment, an example in which the front end 14a of the left upper member 14 is connected to the front end 16b of the left branch gusset 16 via the upper connecting plate 67 and the lower connecting plate 68 has been described. However, the present invention is not limited to this.

For example, the front end 14a of the left upper member 14 may be connected directly to the front end 16b of the left branch gusset 16.

Furthermore, the shapes and structures of the vehicle front structure, the vehicle body, the left front side frame, the left front pillar, the left upper member, the left branch gusset, the left connecting portion, the left bumper beam extension, the bumper beam, the inner panel, the outer panel, the first to third concave portions, the inner central wall, the first to third bending portions, the gusset wall portion, the upper and lower joint pieces, the rear joint piece, the bead, the upper and lower connecting plates, the support wall portion, and the like shown in the embodiment are not limited to those exemplified, and can be changed appropriately.

The present invention is suitable for an application to a vehicle having a vehicle front structure in which a front side frame in a front side portion of a vehicle body is formed into a closed section by an inner panel and an outer panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-011843, filed Jan. 25, 2016, which is hereby incorporated by reference herein in its entirety.

What is claimed is:

1. A vehicle front structure in which a front side frame extends in a vehicle longitudinal direction in a front side portion of a vehicle body, and the front side frame is formed into a closed section by joining an inner panel on an interior side and an outer panel in an exterior side, wherein the front side frame comprises:
   a first bending portion including a first concave portion formed in the outer panel to be concave toward the interior;
   a second bending portion including a second concave portion formed in the inner panel behind the first bending portion in the vehicle body to be concave toward the exterior; and
   a third bending portion formed behind the second bending portion in the vehicle body to be concave toward the interior,
   the inner panel includes an inner central wall extending flat to the rear side of the vehicle body from the first bending portion to the second bending portion,
   a branch gusset extends to tilt from the inner central wall outward in a vehicle width direction and obliquely to a front side via an inside of the first bending portion, and the outer panel is joined to a rear surface of the branch gusset,
   wherein the inner panel comprises an inner wall facing the interior side, an inner upper surface projecting from an upper end of the inner wall to the exterior side, and an inner lower surface projecting from a lower end of the inner wall to the exterior side, the inner panel is formed into a substantially U-shaped section by the inner wall, the inner upper surface, and the inner lower surface,
   the branch gusset comprises a wall portion, an upper flange projecting from an upper end of the wall portion, a lower flange projecting from a lower end of the wall portion, and a rear flange projecting from a rear end of the wall portion to the rear side of the vehicle body,
   the branch gusset is formed into a substantially U-shaped section by the wall portion, the upper flange, and the lower flange,
   the vehicle front structure comprises a connecting portion configured to connect the branch gusset to the inner panel,
   the connecting portion comprises:
   an upper connecting plate projecting from the inner upper surface toward the branch gusset; and
   an lower connecting plate projecting from the inner lower surface toward the branch gusset, the upper flange is joined to the inner upper surface and the upper connecting plate,
   the connecting portion is formed is into a substantially U-shaped section by the upper connecting plate, the lower connecting plate and the support wall portion,
   the lower flange is joined to the inner lower surface and the lower connecting plate, and the rear flange faces or is joined to the inner central wall and,
   the connecting portion, the inner panel, and the branch gusset form a box structure having an almost trapezoidal shape in a plan view.

2. The vehicle front structure according to claim 1, wherein the branch gusset includes a bead formed in a longitudinal direction of the branch gusset.

3. The vehicle front structure according to claim 1, wherein the connecting portion comprises a support wall portion configured to connect a front end of the upper connecting plate and a front end of the lower connecting plate,
   a bumper beam extension is supported by the support wall portion, and
   a bumper beam is provided at a front end of the bumper beam extension.

4. The vehicle front structure according to claim 1, further comprising:
   a front pillar provided outside the front side frame in the vehicle width direction; and
   an upper member extending from the front pillar to tilt to a lower front side in the vehicle body and inward in the vehicle width direction and connected to a front end of the branch gusset,
   wherein the upper member and the branch gusset are tilted to be substantially bilaterally symmetrical.

5. The vehicle front structure according to claim 4, wherein the connecting portion comprises:
   an upper joint flange projecting upward from an outer end of the upper connecting plate; and
   a lower joint flange projecting downward from an outer end of the lower connecting plate, and
   the upper joint flange and the lower joint flange are joined to a front end of the upper member.

6. The vehicle front structure according to claim 1, wherein the third bending portion is formed to have a width in the vehicle width direction larger than widths of the first bending portion and the second bending portion, and
   is formed to be curved outward in the vehicle width direction from a rear side to a front side of the vehicle body.

* * * * *